United States Patent [19]

Saito

[11] Patent Number: 5,089,990

[45] Date of Patent: Feb. 18, 1992

[54] WORD PROCESSOR WITH COLUMN LAYOUT FUNCTION

[75] Inventor: Keizo Saito, Nara, Japan

[73] Assignee: Sharp Kabushiki Kaisha, Osaka, Japan

[21] Appl. No.: 296,363

[22] Filed: Jan. 9, 1989

Related U.S. Application Data

[63] Continuation of Ser. No. 134,548, Dec. 18, 1987, abandoned, which is a continuation of Ser. No. 763,929, Aug. 8, 1985, abandoned.

[30] Foreign Application Priority Data

Aug. 14, 1984 [JP] Japan .............................. 59-169566
Aug. 14, 1984 [JP] Japan .............................. 59-169567

[51] Int. Cl.⁵ .......................... G06F 7/00; G06F 3/14
[52] U.S. Cl. ................................ 395/375; 364/927.2; 364/943; 364/DIG. 2
[58] Field of Search ... 364/200 MS File, 900 MS File

[56] References Cited

U.S. PATENT DOCUMENTS

| | | | |
|---|---|---|---|
| 4,240,075 | 12/1980 | Bringol | 340/798 |
| 4,463,444 | 7/1984 | Daniels et al. | 364/900 |
| 4,491,933 | 1/1985 | Ursin et al. | 364/900 |
| 4,495,600 | 1/1985 | Kikuchi et al. | 340/723 |
| 4,506,343 | 3/1985 | Shipp, Jr. et al. | 364/900 |
| 4,633,430 | 12/1986 | Cooper | 364/900 |
| 4,663,731 | 5/1987 | Ikegami et al. | 400/63 |

Primary Examiner—David Y. Eng
Attorney, Agent, or Firm—Morrison & Foerster

[57] ABSTRACT

A word processor has capabilities for dividing a region corresponding to one page into a plurality of blocks, for specifying a sentence or sentences to be placed into each of the blocks, for specifying priority sequence among these blocks or among the specified sentences, and outputting an image. It may also have additional capabilities for specifying a certain position in a sentence and assigning a position name thereto, specifying a certain region of a sentence and assigning a region name thereto, and carrying out a process regarding the position or the region by using its position name or region name.

1 Claim, 17 Drawing Sheets

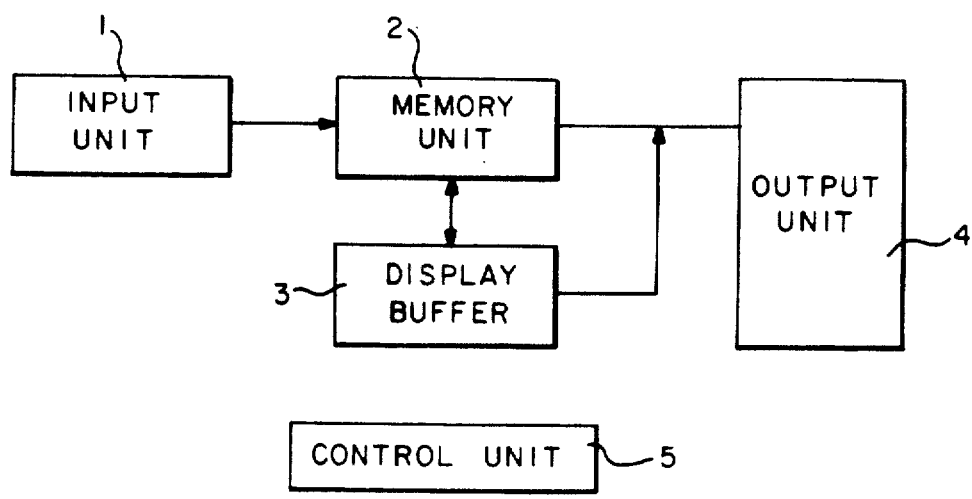
FIG.—1
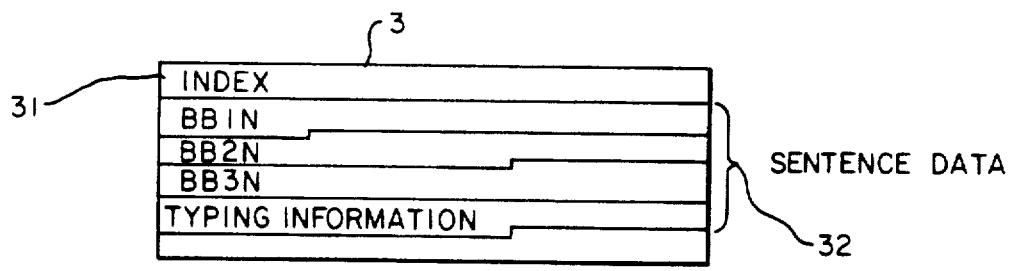
FIG.—2
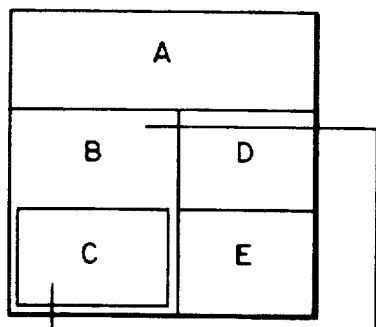
| NAME | FRAME INFORMATION | PRIORITY | FILE | NAME |
|---|---|---|---|---|
| A | | 1 | | |
| B | B INCLUDES C COMPLETELY | 2 | | |
| C | CONTAINED BY B | 3 | | |
| D | | 4 | | |
| E | | 5 | | |
FIG.—5

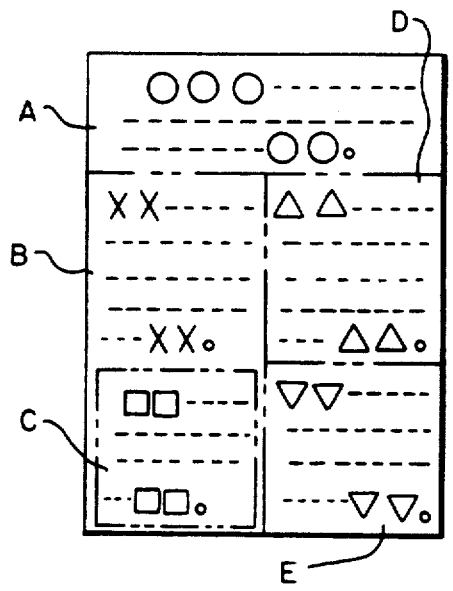
FIG.—6a
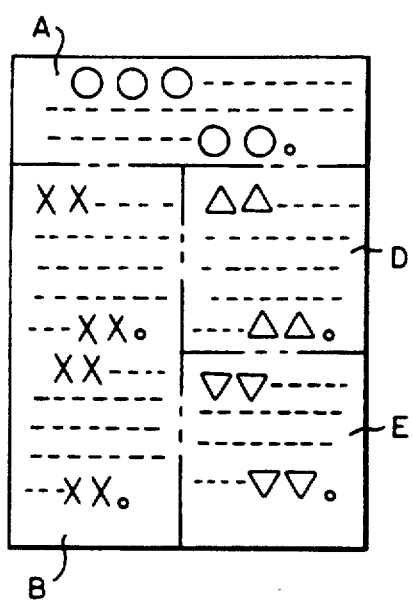
FIG.—6b
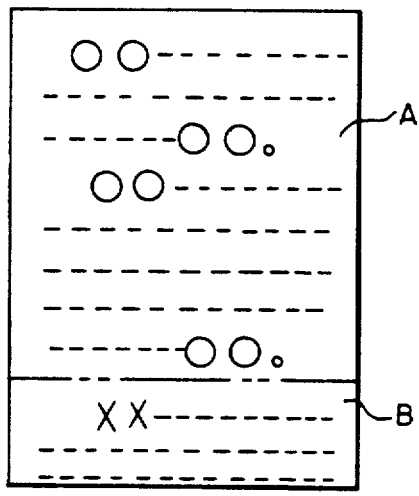
FIG.—7a
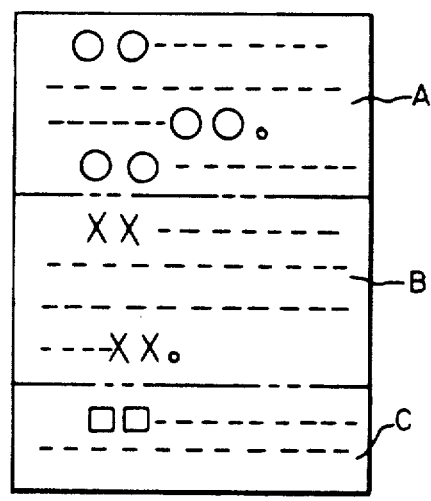
FIG.—7b
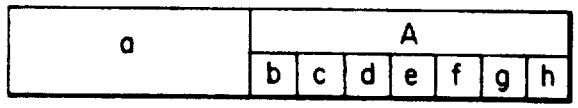
FIG.—8a
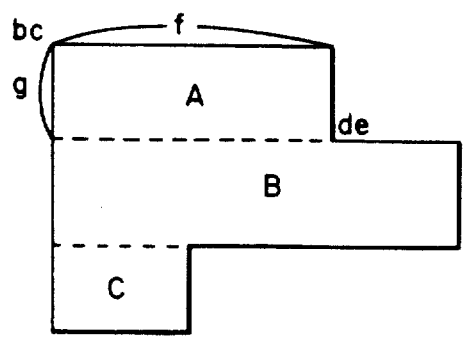
FIG.—8b

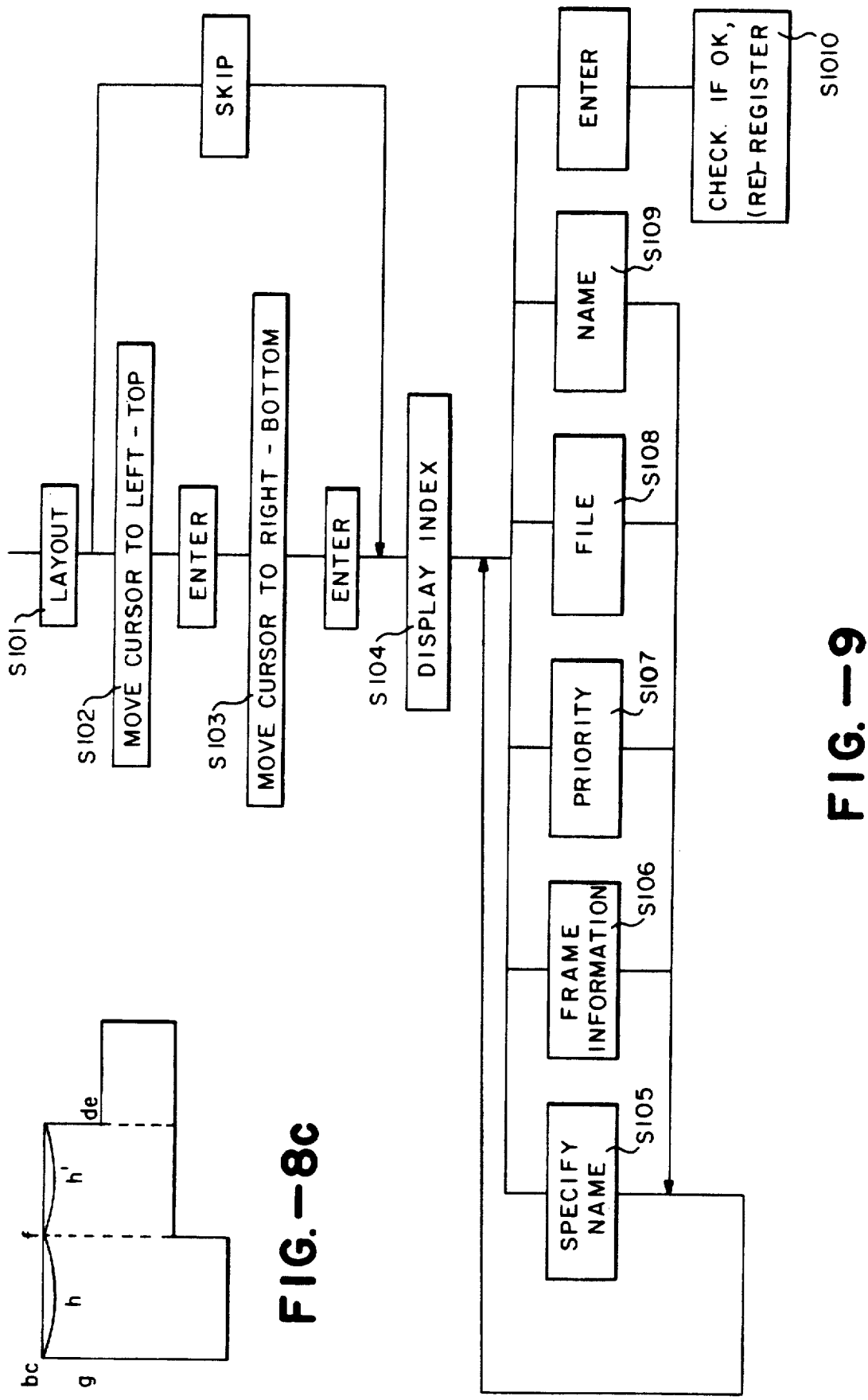

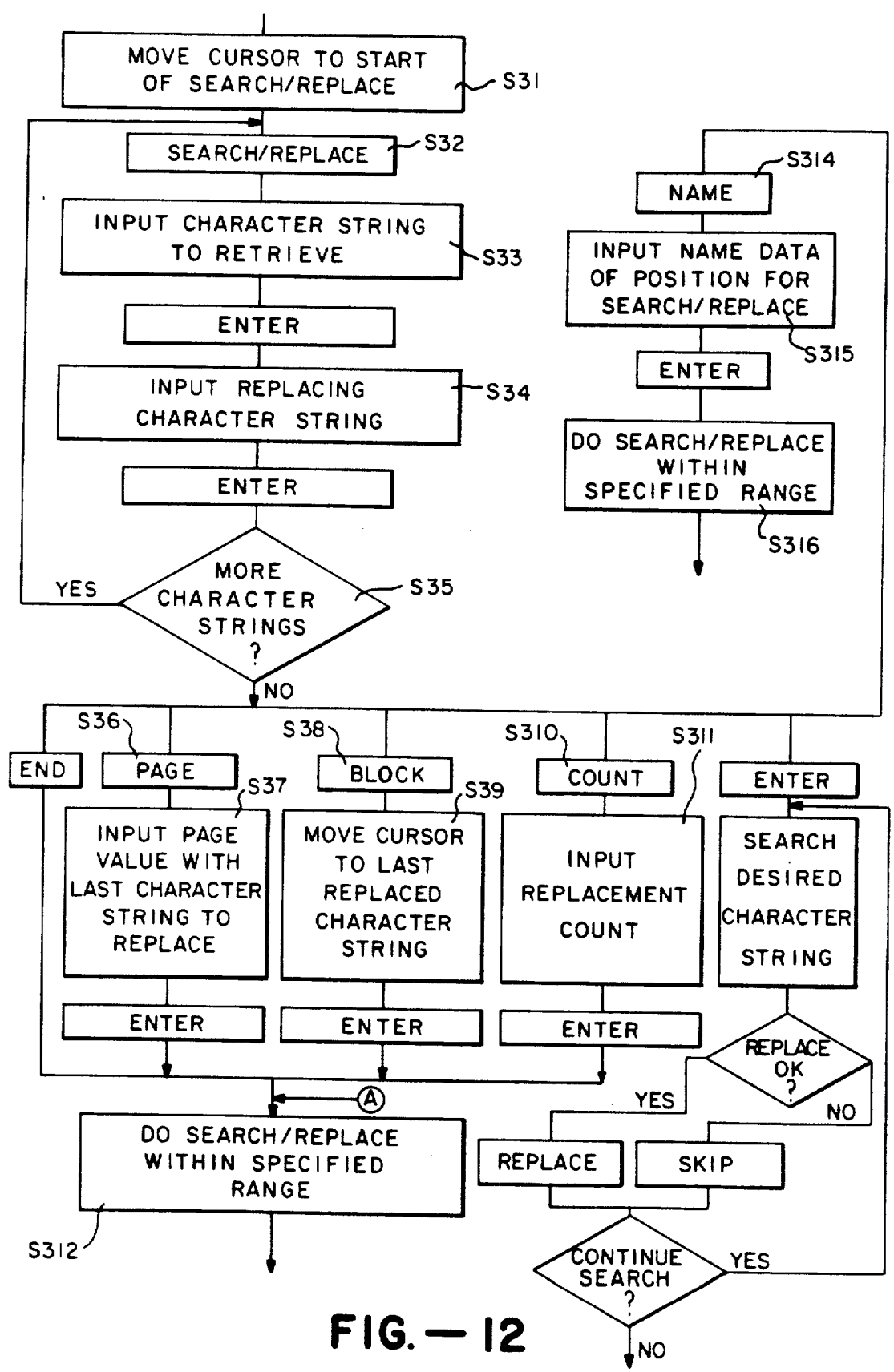
FIG.—12

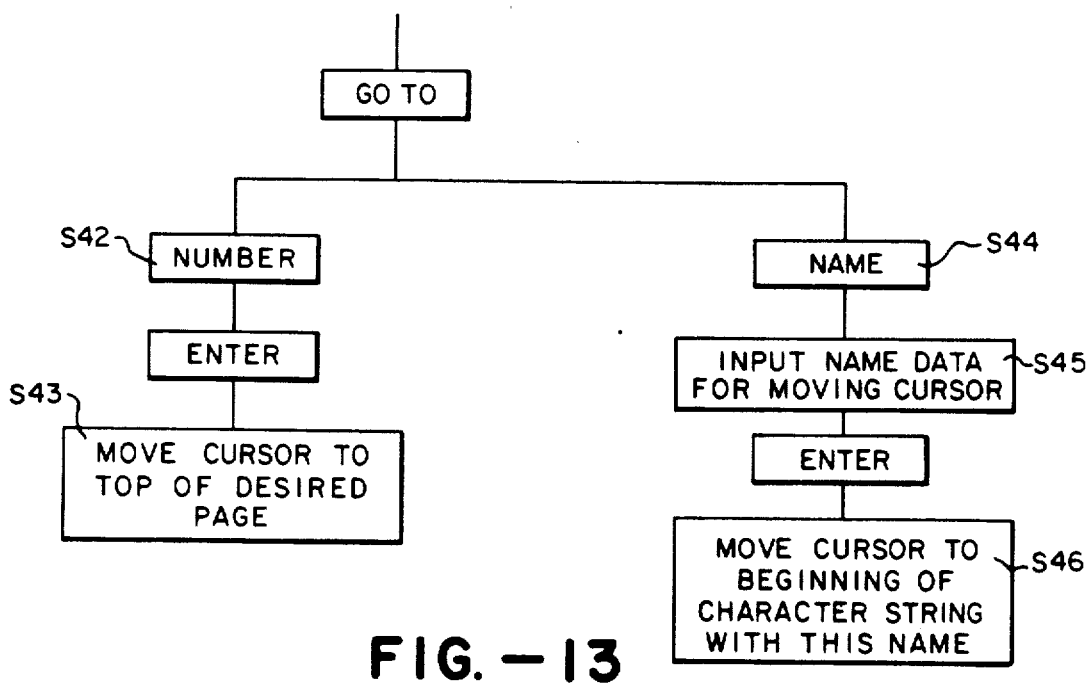
FIG.—13
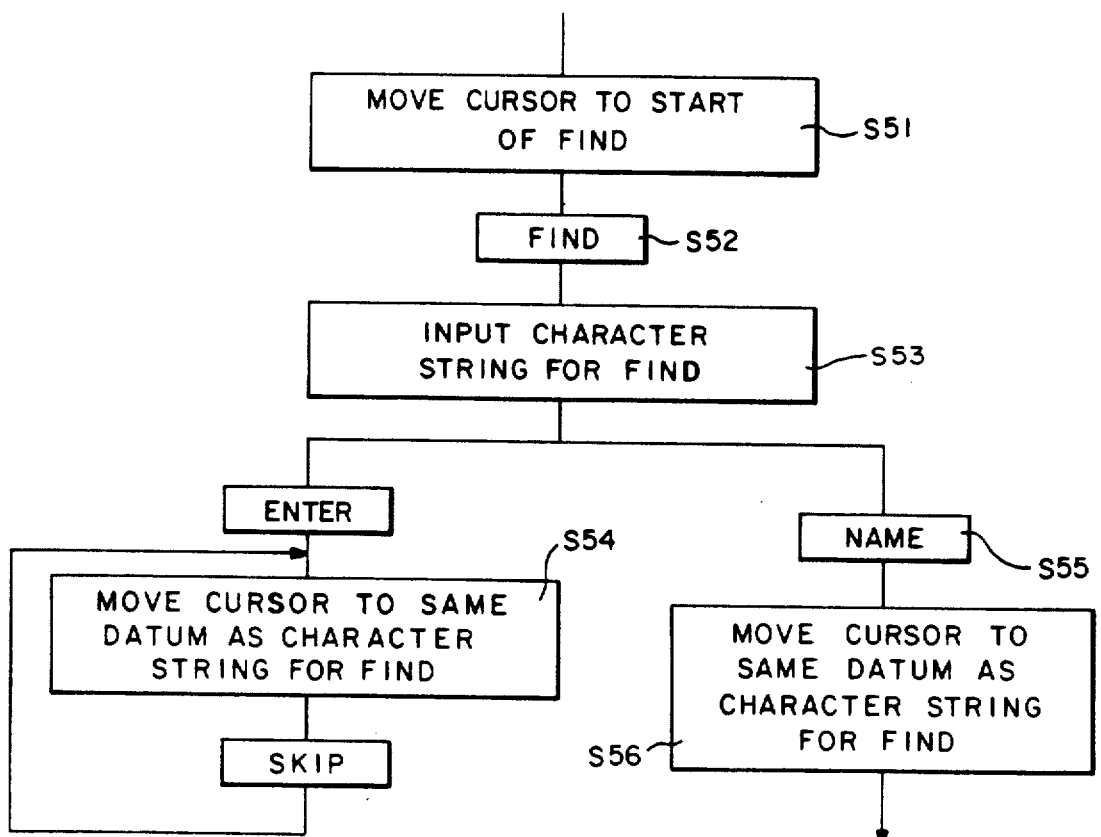
FIG.—14

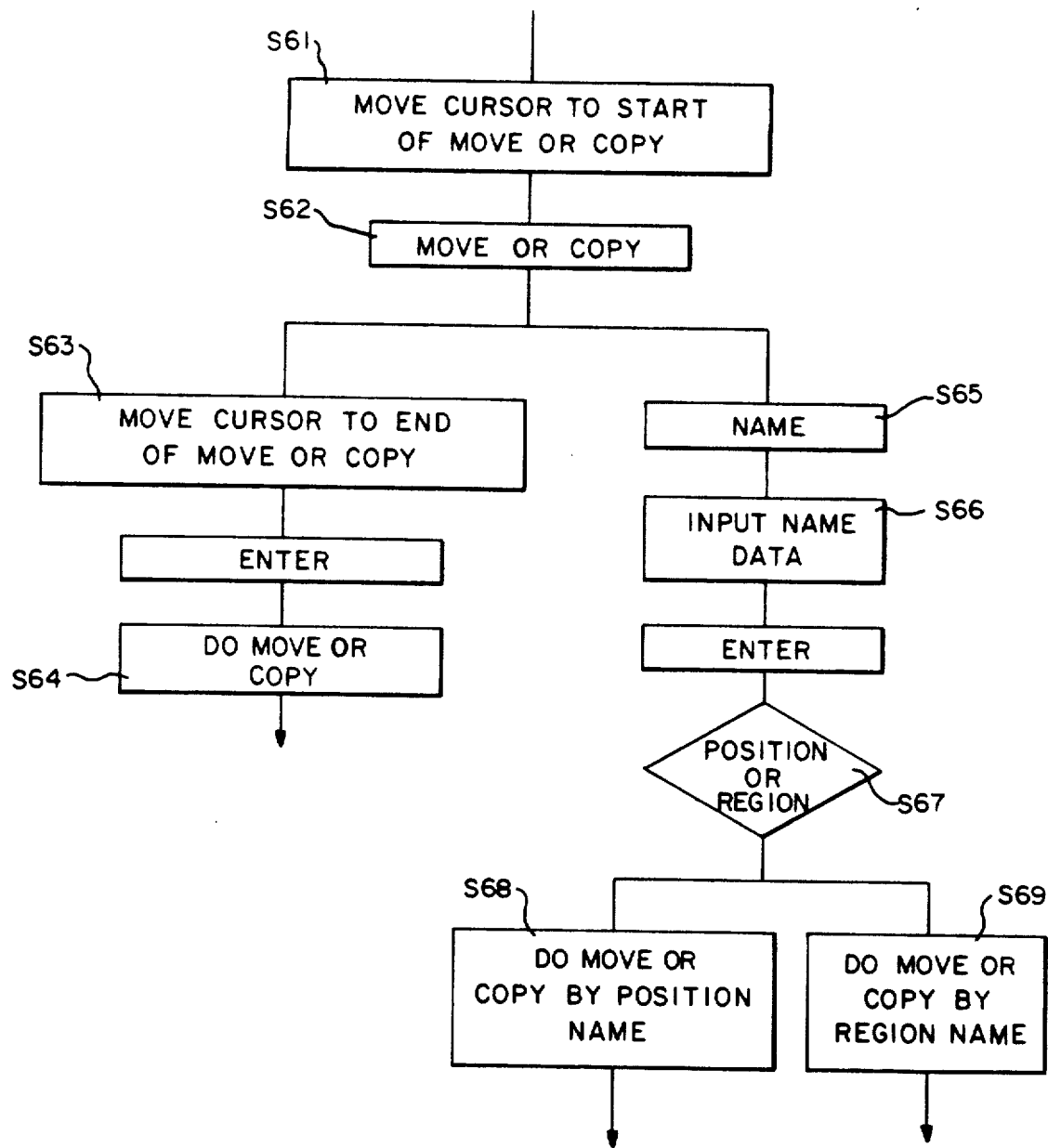
FIG.—15

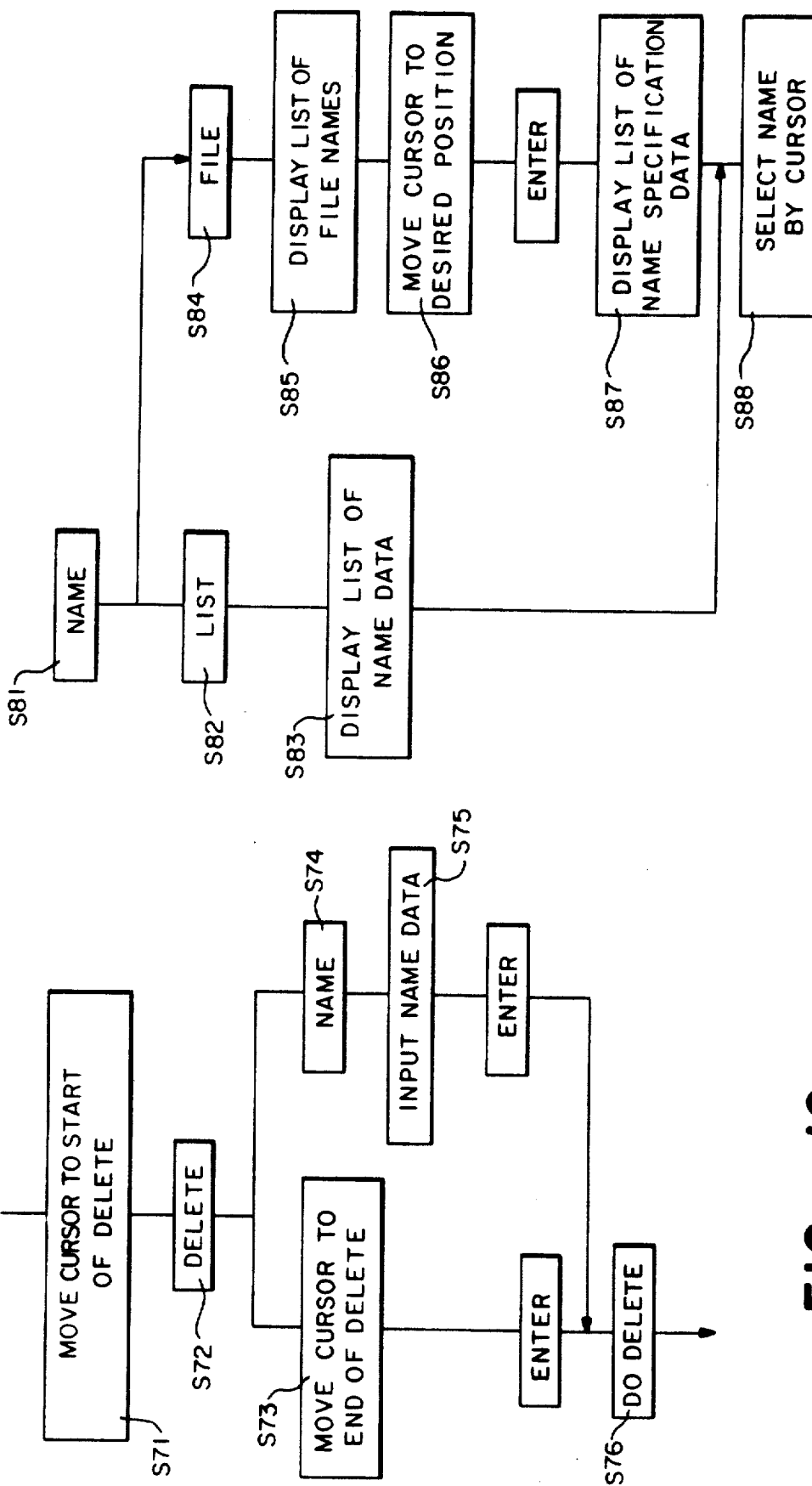

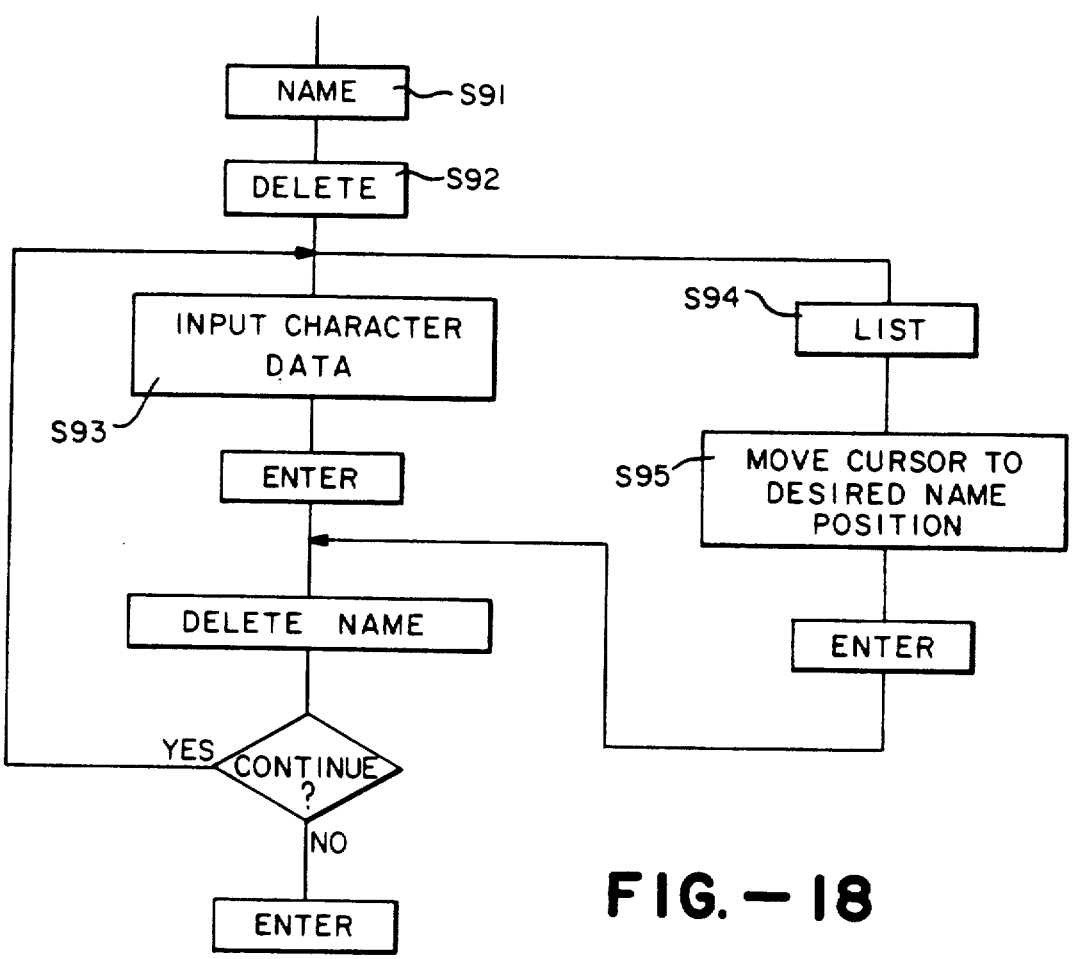
FIG.—18
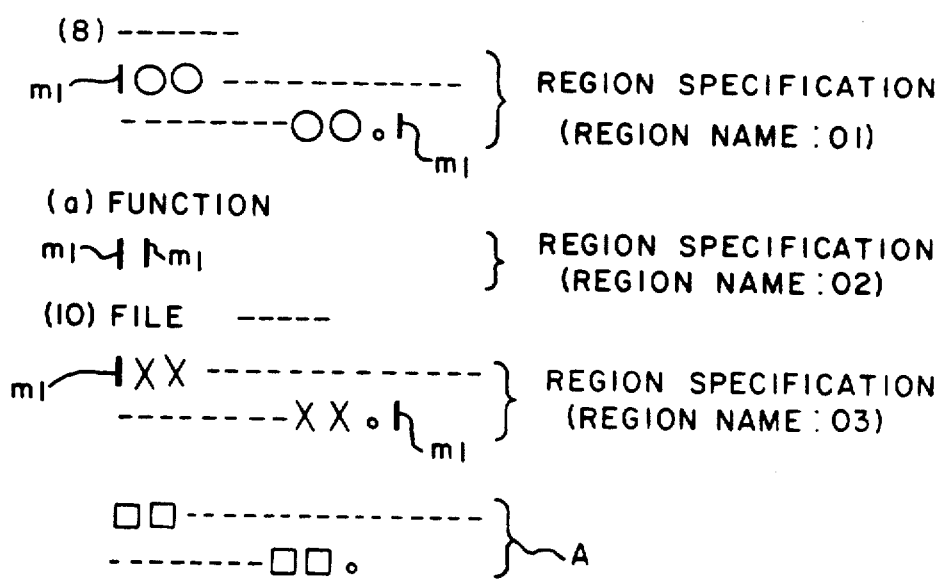
FIG.—19a (8) ---------
      1 OO ---------
      --------- OO o 1

(a) FUNCTION
m1 ⌐ □□ -------------
      --------- □□ o ⌐ m1    } A

(10) FILE ------
      1 X X ---------
      --------- X X o 1

FIG. — 19b (8) ---------
m2 ⌐ OO ---------
POSITION SPECIFICATION --------- OO o
(POSITION NAME : a)

(a) FUNCTION
      ⌐ m2  POSITION SPECIFICATION
                        (POSITION NAME : b)
(10) FILE -----
m2 ⌐ X X ---------
      --------- X X o

POSITION SPECIFICATION (POSITION NAME : c)

(a) FUNCTION
m₂ ┤ □ □ ------------ ⎫
    ----------□ □ ₒ    ⎬ A
                        ⎭

(10) FILE -----
     I X X -------------
     ----------X X ₒ

(9) FUNCTION
m₁ ┤ □ □ ------------
    ---------□ □ ₒ
    X X -------------
    ----------X X ₒ

(10) FILE --------
     X X -------------
     ----------X X ₒ

FIG. —21a

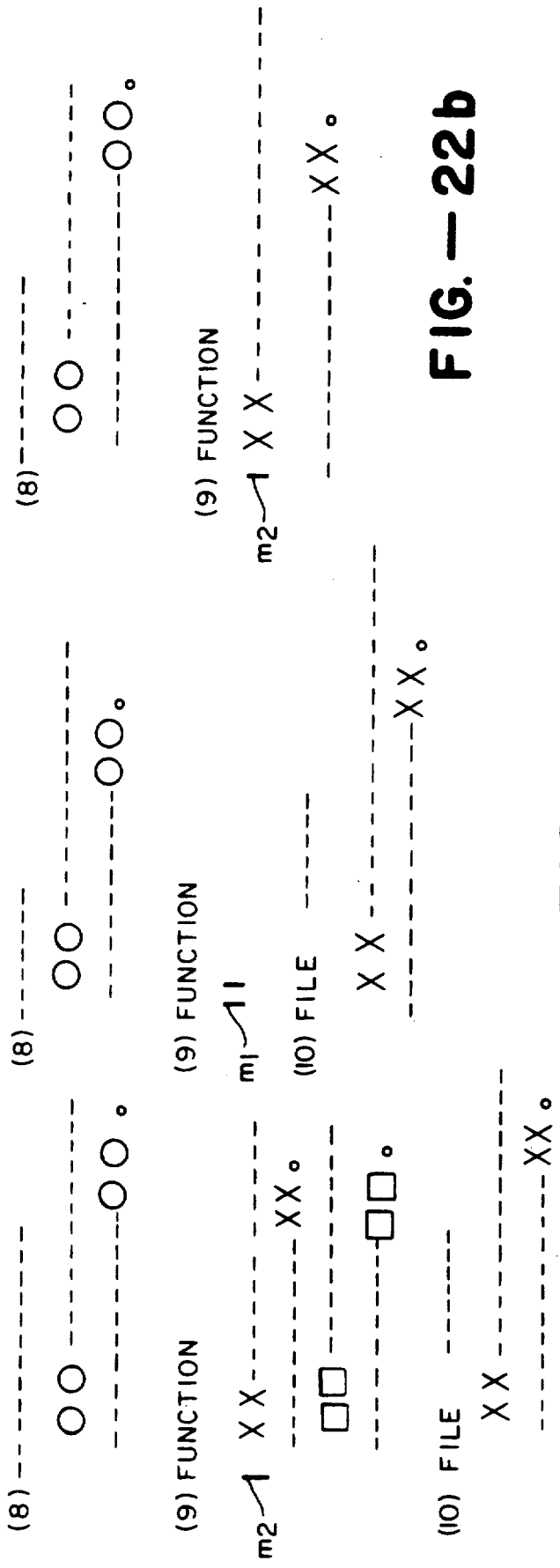

FIG.—25

| NAME | NO. | F L G | START | END | LINK |
|---|---|---|---|---|---|

FIG.—26

| NUMBER OF BYTES | CONTROL | CHARACTER STRING |
|---|---|---|

FIG.—27

| SUB | NO. 1 | NO. 2 |
|---|---|---|

FIG.—28

| NO. OF BYTES | CONTROL | * | ( | 1 | 0 | ) | F | I | L | E |
|---|---|---|---|---|---|---|---|---|---|---|

| NO. OF BYTES | CONTROL | * | ( | 9 | ) | F | U | N | C | T | I | O | N |
|---|---|---|---|---|---|---|---|---|---|---|---|---|---|

| NO. OF BYTES | CONTROL | 1B | 20 | 02 | SP | 1B | 21 | 02 |
|---|---|---|---|---|---|---|---|---|

| | NAME | NAME NO. | FLG | BEGIN | END | LINK |
|---|---|---|---|---|---|---|
| 01 | REGION NAME | 01 | 01 | 10 | 16 | +01 |
| 02 | REGION NAME | 02 | 01 | 11 | 11 | +01 |
| 03 | REGION NAME | 03 | 01 | 12 | 15 | +01 |

WORD PROCESSOR WITH COLUMN LAYOUT FUNCTION

CROSS-REFERENCES TO RELATED APPLICATIONS

This application is a continuation of our earlier filed application Ser. No. 07/134,548, filed Dec. 18, 1987 (now abandoned), which application is a continuation of our earlier filed application Ser. No. 06/763,929, filed Aug. 8, 1985 (now abandoned), both of which applications are incorporated herein by reference and to which applications we claim priority under 35 USC §120. Further, this application is based on earlier filed Japanese Application 59-169566, filed Aug. 14, 1984, and Japanese Application 59-169567, filed Aug. 18, 1984, both of which applications are incorporated herein by reference, and applicants claim priority to such applications under 35 USC §119.

BACKGROUND OF THE INVENTION

This invention relates to improvements in word processor operability.

The so-called column layout function is one of the editing functions of a word processor. This function may be used to modify the normal document format in which character information is sequentially outputted sideways from the left-hand of the top line of a page until its entire width is covered and then to the next line, ending at the right-hand edge of the bottom line as shown in FIG. 4a, into an edited document format, which may be easier to read, by dividing the page into two blocks, one on the left-hand side and the other on the right-hand side as shown, for example, in FIG. 4b which illustrates the situation where this function has been used regarding blocks B and C.

According to the conventional column layout method, character information is sequentially outputted in the order of blocks A, B and C. If the length of a sentence is changed by modification, insertion or deletion, therefore, the end of the sentence may move into a different block. It generally required a complicated operation to establish a correlation between sentences and blocks.

The so-called Search and Replace is another editing function which is used for retrieving a particular character string, etc. within a specified region in a sentence and to replace it by another character string. Conventionally, the following two methods of Search and Replace were available:
(a) method of asking the operator to input an instruction whenever the specified character string is detected, and
(b) method of performing all processing at once by initially specifying a region in which the Search and Replace is to be effected.

The method (b) is convenient because the processing can be effected efficiently. The method of specifying a page or pages to be processed (b-1), the method of using the cursor to specify the beginning and end points of the region of interest (b-2), the method of specifying the frequency of processing (b-3), the method of processing the sentence file (b-4) till its end, etc. have been used.

When a modification, addition or deletion process is effected to a sentence under consideration, a character information which originally could fit within one page may no longer be able to do so or another character information which originally covered two pages may come to fit in one page. If the format is changed such as the paper size, character interval or line interval, the number of pages may also change.

Accordingly, it is a difficult matter to specify the beginning and final pages. In the case of the method (b-1), it is necessary to first output the document into a display means in order to ascertain the positions. Thus, the processes effectively become as troublesome as the method (b-2) of specifying positions by a cursor. The method (b-3) of specifying the frequency of processing cannot be used if it is completely unknown at the beginning how many times the specified character string or word will appear within the given region.

The Go To and Find (or Search) are functions by means of which the operator can move the cursor to a desired position. Since the parameter to be inputted for these functions is generally a page information, the situation is similar to that of the Search and Replace function discussed above and it is rare that the desired page can be referenced by the first try. Even if the desired page has been retrieved, furthermore, the cursor is found at the top of the page and the user must move the cursor further to the desired position. If the Find function is used, on the other hand, the cursor may detect a character string which happens to coincide with the specified character string and stop there.

The Move, Copy and Delete functions are also well known, but they, too, frequently effect position specification and region specification like the Search and Replace function and the Go To function. Thus, it is no less troublesome to operate these functions when there are many pages to be considered.

It is also necessary to specify a region by its page number in the case of an automatic operation whereby a plurality of processes are arranged to be carried out by a one-touch operation and the region intended by the operator cannot always be specified reliably. In summary, there has been known no simple operation for specifying a region and a considerable amount of work had to be carried out before performing various kinds of operations in a specified region.

SUMMARY OF THE INVENTION

It is therefore an object of the present invention in view of the above to provide a word processor which simplifies the work of editing a document.

Another object of the present invention is to provide a word processor which makes it relatively easier to specify a region for various types of processing. In one aspect, the present invention provides a word processor which comprises devices with capabilities for partitioning a region corresponding to one page into a plurality of blocks, specifying a sentence or sentences to be allocated to each of these blocks, specifying a priority sequence among the blocks or the specified sentences and outputting a display according to the specification from each of the aforementioned means.

In another aspect, the present invention provides a word processor which comprises devices with capabilities for specifying a particular position of a sentence and assigning a name to this position, for specifying a particular region of a sentence and assigning a name to this region and for using these names to carry out processes at the specified position or region.

BRIEF DESCRIPTION OF THE DRAWINGS

The accompanying drawings, which are incorporated in and form a part of the invention, illustrate embodiments of the present invention and, together with the description, serve to explain the principles of the invention.

FIG. 1 is a block diagram showing one embodiment of the present invention.

FIG. 2 is a drawing which shows the file structure of the display buffer used in the embodiment of FIG. 1.

FIG. 5 is a drawing for showing the relationship between the individual blocks and transmission data according to another embodiment.

FIGS. 6a and 6b are drawings for showing the formats of outputted documents according to the embodiment of FIG. 5.

FIGS. 7a and 7b are drawings for showing the formats of outputted documents according to still another embodiment.

FIGS. 8a, 8b and 8c are drawings for explaining layout information in the display buffer of FIG. 3.

FIG. 9 is a flow chart showing a procedure for specifying region names.

FIG. 12 is a flow chart which shows the operation procedure for the Search and Replace process.

FIG. 13 is a flow chart which shows the operation procedure for the Go To process.

FIG. 14 is a flow chart which shows the operation procedure for the Find process.

FIG. 15 is a flow chart which shows the operation procedure for the Move and Copy processes.

FIG. 16 is a flow chart which shows the operation procedure for the Delete process.

FIG. 17 is a flow chart which shows the procedure for displaying a list of names.

FIG. 18 is a flow chart which shows the procedure for deleting a name.

FIGS. 19a, 19b, 20a, 20b, 21a and 21b are drawings which show examples of the Move process.

FIGS. 22a and 22b are drawings which show examples of the Delete process.

FIGS. 23 through 27 show examples of file structure for a word processor of the present invention.

FIGS. 28 and 29 show how data may be stored.

DETAILED DESCRIPTION OF THE INVENTION

Figure 3:
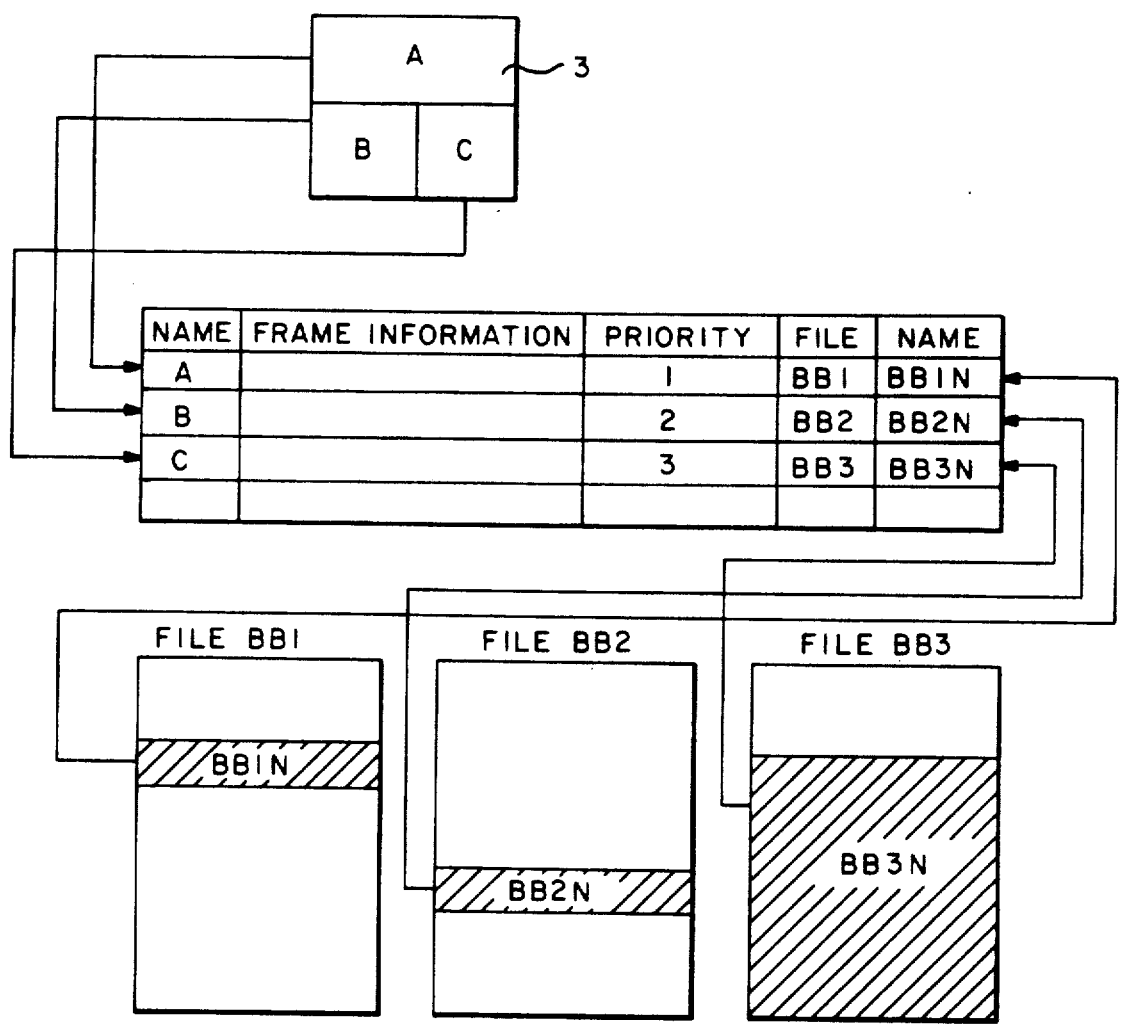
FIG. 3 is a drawing for showing the relationship between the individual blocks of a display buffer and transmission data.

Reference being made to FIG. 1 which is a schematic block diagram, there is shown an input unit 1 such as a keyboard for inputting character information data and a memory unit 2 for storing and editing the character information data inputted from the input unit 1. A core memory, an integrated circuit (IC) memory, a magnetic disc, etc. may be used as the memory unit 2. Numeral 3 indicates a display buffer which is provided in accordance with the present invention. It is not used for ordinary editing but is made available through a mode switching operation when the editing involves the laying out of a page and assigning priority sequence and names. A core memory, an IC memory, etc. may be used for the display buffer 3. Numeral 4 indicates an output unit such as a printer or a display for outputting character information data in the memory unit 2 and the display buffer 3. Numeral 5 is a control unit such as a microprocessor for controlling the input and output of signals among the aforementioned units as well as the overall operation of the system.

The display buffer 3 may be considered as a kind of one-page file and includes an index 31 at its beginning as shown in FIG. 2. The index 31 contains frame information for the layout of a screen corresponding to one page, names of the blocks into which the page is divided, priority sequence for data transmission purpose, file names from which data transmission is intended, and information for specifying the beginning and the end of a sentence of interest within the file from which transmission is to take place. Sentence data which are inputted not from another file but by itself can be stored after the aforementioned name information. This is represented by "Typing information" in FIG. 2. The aforementioned frame information is a kind of format information but includes only such information that relates to a frame. General format information such as character width, line interval and tab is included in the individual sentence data 32. The frame information allows the overlapping of frames. Data are stored in the display buffer 3 sequentially in the ascending order according to the specification of the priority sequence information.

The file name information is for indicating the file from which data should be brought into the individual blocks. The sentence specification information indicates the region in that file from which data are to be transferred. The sentence to be transferred may be identified either by assigning a region name to a particular character string from its beginning to its end and specifying this region name or by assigning a position name to determine only the position of its starting point and specifying this position name. As for data not from another file but of its own inputted through typing, etc. after the layout is set, its own file name is assigned. In other words, the entire data inputted through typing, etc. are contained under the same file name.

An example shown in FIG. 3 will be explained next more in detail. The display buffer 3 is divided into three blocks named A, B and C as shown. The frame information is composed of the coordinate data of the individual blocks A, B and C. It itself has a file name ABC. As shown inside the index 31, files BB1, BB2 and BB3 are sources of transfer and sentences BB1N, BB2N and BB3N respectively in these files are specified. Priority sequence 1, 2 and 3 are assigned to the blocks A, B and C in this order. Thus, data transfer starts from the sentence data for BB3N in file BB3. Simultaneously with this transfer, transferred data become stored after the index. Similarly, the sentence data for BB2N in file BB2 and those for BB1N in file BB1 are sequentially transferred and stored.

When the transferred sentence data cannot be used directly but require modifications, the original data, for example, in BB3N of file BB3 may be modified or the data in the file ABC may be modified without correcting the original data. By the former method, it is necessary only to correct the original data without effecting any change in the index 31. In this situation, the updated original data after corrections are made will be transferred when the file ABC is inputted to the display buffer 3. By the latter method, on the other hand, it is necessary only to change BB3 or the file name information in the index 31 into its own file name ABC. Thus, correction can be effected freely independently of the original data. If the sentence specification is effected by a region name, transfer is carried out until the block becomes full or till the end of the data in the source.

Figures 4A, 4B:
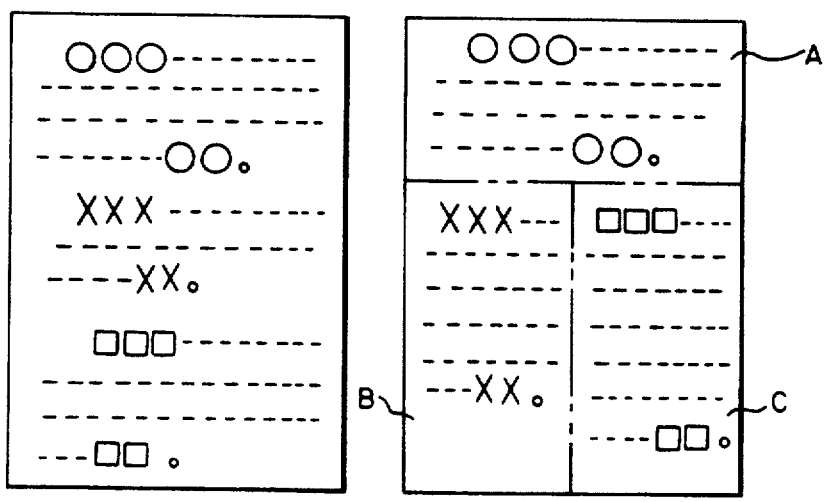
FIGS. 4a and 4b are drawings for showing formats of outputted documents.

FIGS. 4a and 4b show formats of an outputted document when the column layout function is not used and when it is used, respectively. In the case of FIG. 3, character information is outputted in a format shown in FIG. 4b.

FIG. 5 shows another example with a different layout. A page is divided into five blocks A, B, C, D and E. Block C is included in block B but the priority sequence of block B is 2 while that of block C is 3. FIG. 6a shows the format of outputted sentences according to this frame information. In this situation, if the amount of data in the transfer source of the sentence in block B is increased, the area for block C comes to be covered as shown in FIG. 6b so that the sentence specified in block C disappears. If the priority sequence is reversed such that the priority sequence of block B is 3 and that of block C is 2, however, the display will remain as shown in FIG. 6a no matter how much the amount of data is increased at the source of sentence transfer in block B because block C has higher priority.

The present invention is applicable even when the column layout function is not utilized. FIGS. 7a and 7b are such examples. In FIG. 7a, a page is divided from the top into three blocks A, B and C with block A having high priority and containing a large amount of data. In other words, block A takes a large area so that blocks B and C are pressed downward, block C being completely pushed out of the screen. If the priority sequence of block B is made higher than that of block A and its coordinates are adjusted higher, blocks B and C move up as shown in FIG. 7b and a final portion of block A becomes invisible, covered by block B.

FIGS. 8a, 8b and 8c are drawings for explaining the frame information inside the index 31. Reference being made to FIG. 8a, "a" is the total number of bytes that are used and "b" through "h" are data for each block. When a division is made into three rectangles as shown in FIG. 8b, data "b" through "h" are set for each of the rectangles. In the example of FIG. 8a, "b" and "c" respectively specify vertical and horizontal coordinates of the beginning point, "d" and "e" respectively specify vertical and horizontal coordinates of the end point, "f" and "g" indicate respectively the horizontal and vertical dimensions of the block, and "h" is the width of the sentence frame. When the page is divided vertically as shown in FIG. 8c, "h" is the remaining width of the sentence frame after "h'" is subtracted from "f".

FIG. 9 is a flow chart which shows an example of procedures for specifying region names. The steps $S_{101}$–$S_{1010}$ shown therein are as follows:

$S_{101}$: Input layout key.
$S_{102}$: Move the cursor to the left-hand top position.
$S_{103}$: Move the cursor to the right-hand bottom position.
$S_{104}$: Display index.
$S_{105}$: Move the cursor by tab to desired position and specify name.
$S_{106}$: Specify the left-hand top and right-hand bottom positions again in the case of SKIP.
$S_{107}$: Input priority key.
$S_{108}$: Input file key.
$S_{109}$: Input name key.
$S_{1010}$: Check, and if OK, register again.

In summary, a page can be partitioned into a plurality of blocks and edited by specifying priority sequence of each block so that display can be effected appropriately according to this invention even if the lengths of sentences are changed and documents can be edited in a convenient format for easy reading.

Figure 10:
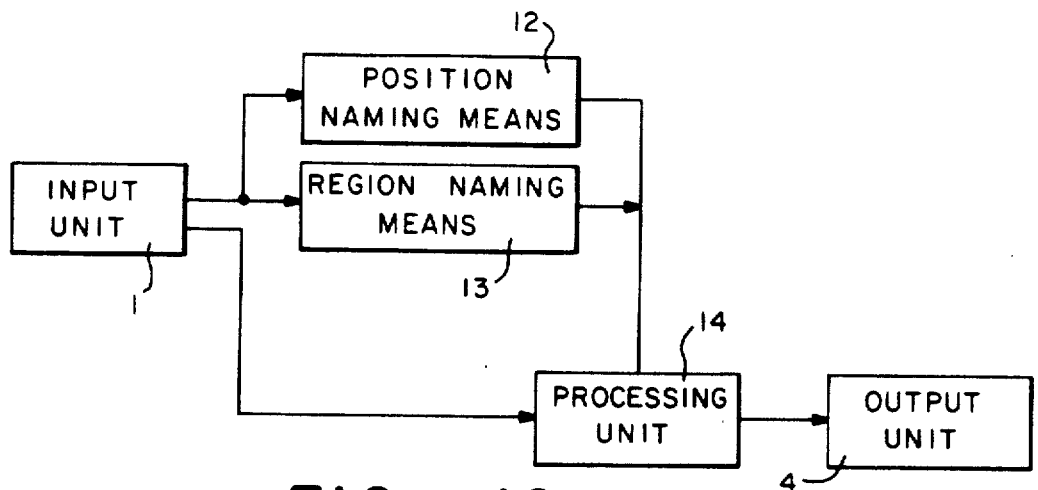
FIG. 10 is a block function diagram for a word processor embodying the present invention.

Reference being made next to FIG. 10 which is a block function diagram of the word processor of FIG. 1, the name of a position or a region is inputted from the input unit 1 such as a keyboard. Position names are assigned to specified positions in a file and stored by a position naming means 12 and region names are assigned to specified regions in a file and stored by a region naming means 13. When a name and a detail of process are inputted subsequently from the input unit 1, the specified process is carried out by a processing unit 14 regarding the position or region corresponding to the specified name and the results are outputted to the output unit 4. In what follows, the aforementioned function of carrying out a process by specifying a name will be referred to as the name function.

Figure 11:
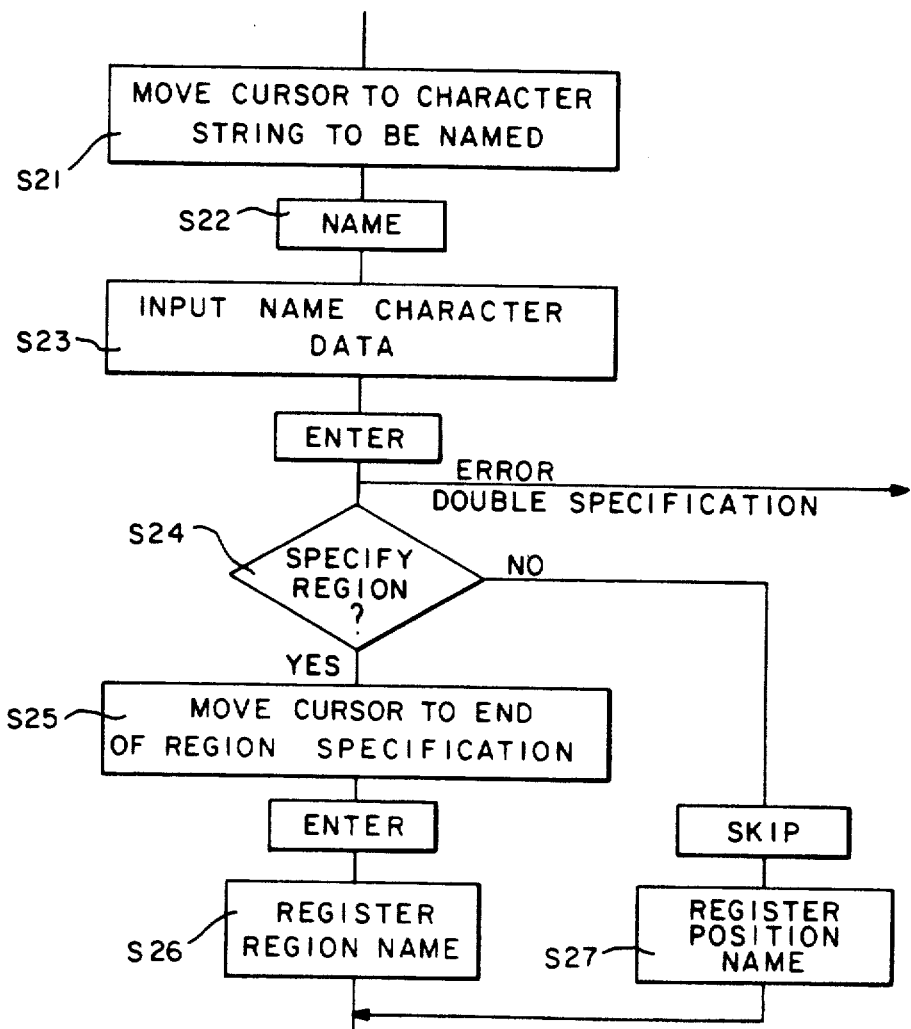
FIG. 11 is a flow chart which shows the procedure for assigning a name.

Various types of processing will be explained below. FIG. 11 is a flow chart which shows a procedure for assigning a name wherein steps $S_{21}$–$S_{27}$ are as follows:

$S_{21}$: Move the cursor to the beginning point of the character string to be named.
$S_{22}$: Input the beginning of naming by pressing the name key.
$S_{23}$: Input the character data for the name to be assigned.
$S_{24}$: Check whether a region or a position is specified.
$S_{25}$: Move the cursor to the end point of the character string in the case of region specification.
$S_{26}$: Register a region and its name.
$S_{27}$: Register a position and its name.

FIG. 12 is a flow chart which shows the operation procedure for the Search and Replace process wherein steps $S_{31}$–$S_{316}$ are as follows:

$S_{31}$: Move the cursor to the starting point of the program for carrying out a Search and Replace process.
$S_{32}$: Input the starting of Search and Replace process.
$S_{33}$: Input a character string (or a word) to be retrieved.
$S_{34}$: Input a character string (or a word) for replacing the retrieved character string.
$S_{35}$: Check that the input of a character string (or a word) has been completed.
$S_{36}$ and $S_{37}$: Input page-specifying data.
$S_{38}$ and $S_{39}$: Input stopping position.
$S_{310}$ and $S_{311}$: Input replacement count.
$S_{312}$: Execute Search and Replace within the range specified above.
$S_{313}$: Retrieve desired character string on pages specified by $S_{36}$ and $S_{37}$ and execute until stopping of retrieval is specified.
$S_{314}$: Input the name key for starting the name function.
$S_{315}$: Input the name data of the position for Search and Replace.
$S_{316}$: Execute Search and Replace within the specified range.

Of the above steps, $S_{36}$–$S_{313}$ are conventional steps. Steps $S_{314}$–$S_{316}$ represent the new processing function according to the present invention.

FIG. 13 is a flow chart which shows the operation procedure for the Go To process wherein steps $S_{41}$–$S_{46}$ are as follows:

$S_{41}$: Input the Go To key for starting the Go To function.

$S_{42}$: Input the number of pages by numerical value keys.

$S_{43}$: Move the cursor to the starting point of a desired page.

$S_{44}$: Input the name key for starting the name function.

$S_{45}$: Input the character data for the name of the position or region where the cursor is to be moved.

$S_{46}$: Move the cursor to the beginning point of the character string to which the specified name is assigned.

Of the above steps $S_{42}$ and $S_{43}$ are conventional steps and $S_{44}$-$S_{46}$ represent the new processing function.

FIG. 14 is a flow chart which shows the operation procedure for the Find process wherein steps $S_{51}$-$S_{56}$ are as follows:

$S_{51}$: Move the cursor to the starting position for the Find process.

$S_{52}$: Input the Find key for starting the Find function.

$S_{53}$: Input a character string for the Find process.

$S_{54}$: Retrieve from the character string data a datum which is the same as the character string desired for the Find process and move the cursor to its position.

$S_{55}$: Input the name key for starting the name function.

$S_{56}$: Retrieve a datum which is the same as the character string for the Find process among those specified by the name.

Of the above steps, $S_{54}$ is a conventional step and $S_{55}$ and $S_{56}$ represent the new processing function.

FIG. 15 is a flow chart which shows the operation procedure for the Move or Copy process wherein steps $S_{61}$-$S_{69}$ are as follows:

$S_{61}$: Move the cursor to the starting position for the Move or Copy process.

$S_{62}$: Input the Move or Copy key.

$S_{63}$: Move the cursor to the end point for the range of processing.

$S_{64}$: Execute the Move or Copy process.

$S_{65}$: Input the name key for starting the name function.

$S_{66}$: Input name data.

$S_{67}$: Check whether it is position or region specification.

$S_{68}$: Execute processing by the name of a position.

$S_{69}$: Execute processing by the name of a region.

Of the above steps, $S_{63}$ and $S_{64}$ are conventionally used steps and steps $S_{65}$-$S_{69}$ represent the new processing function.

FIG. 16 is a flow chart which shows the operation procedure for the Delete process wherein steps $S_{71}$-$S_{76}$ are as follows:

$S_{71}$: Move the cursor to the starting position for the Delete process.

$S_{72}$: Input the Delete key.

$S_{73}$: Move the cursor to the end point of the range to be processed.

$S_{74}$: Input the name key for starting the name function.

$S_{75}$: Input name data.

$S_{76}$: Execute the Delete process.

Of the steps above, $S_{73}$ is a conventional step and steps $S_{74}$ and $S_{75}$ represent the new processing function.

FIGS. 17 and 18 are flow charts which show other procedures related to the name function. FIG. 17 is an example of display of a list of names wherein steps $S_{81}$-$S_{88}$ are as follows:

$S_{81}$: Input the name key.

$S_{82}$: Input the LIST key.

$S_{83}$: Display a list of name data currently specified in the file.

$S_{84}$: Input the file key.

$S_{85}$: Display a list of file names.

$S_{86}$: Move the cursor to the position of a desired file.

$S_{87}$: Display a list of name specification data in the specified file.

$S_{88}$: use the cursor to appropriately select a desired name.

This process can be carried out at any same time by pressing the name key and is included in the name function. This can be specified by the cursor. It is not necessary to specify the name by a key.

FIG. 18 is an example of process for deleting a name wherein steps $S_{91}$-$S_{97}$ are as follows:

$S_{91}$: Input the name key.

$S_{92}$: Input the delete key.

$S_{93}$: Input the character data of the name to be deleted.

$S_{94}$: Input the LIST key.

$S_{95}$: Move the cursor to the character data of the name to be deleted in the outputted list of name data.

$S_{96}$: Continue until completion of the process is ascertained.

Next, the processing of sentences with the Move is explained. In FIG. 19a which shows a portion including sentences having subheaders 8, 9 and 10, a region is specified with region name 01 for the sentence under the subheader 8 and another region is specified with region name 03 for the sentence under the subheader 10. There is currently no sentence in the region under subheader 9 titled "Function" but this region is specified with region name 02. In the above, $m_1$ indicates code data for specifying regions and A is a sentence adapted to be moved. If the Move process is performed on the sentence A at this moment by specifying the region name 02, the sentence A is moved as shown in FIG. 19b into the space between the two control code data $m_1$ which specify a region.

FIG. 20a shows an example in which specifications are made by names of positions, position names a, b and c indicating the starting points for the sentences to be inserted after the subheaders 8, 9 and 10 and $m_2$ being code data for specifying positions. When the Move process is performed by specifying position name b, the sentence A is moved as shown in FIG. 20b to the space next after the control code datum $m_2$ specifying a position. Although FIG. 19b and FIG. 20b are identical, the procedures shown above are different from the conventional procedure in that the sentence is moved one datum after the specified position while by the conventional method of specification by a cursor the sentence is moved to the region before the specified position.

When a region is specified by its name, both its beginning and end points are involved and character data are usually moved to the space one datum after the position of the starting point. By changing the default value, however, it is possible to move the data to the end point. FIG. 21a shows the result obtained when the data are moved from the condition of FIG. 19b in the end position mode. FIG. 21b is the result of moving data in the position specification mode by naming a position. It is shown that the data are inserted at different positions between these two cases.

The procedure described above can be performed similarly for the Copy process. If the user is not certain about a name, of the procedure illustrated in FIG. 17 may be used to have a list of names displayed. The desired name can be specified in the list by using the cursor.

FIG. 22a shows an example of the Delete process and represents the condition after the region name 02 of FIG. 19b was specified to delete a sentence. In the case of a region specification, all data from its beginning point to its end point are deleted but the name of the region and codes for the starting and end points remain unaffected. If it is desired to delete the name, the procedure for deleting a name shown in FIG. 18 can be utilized.

FIG. 22b represents an example where a sentence has been deleted by specifying the position name b of FIG. 20b. This represents a different result from FIG. 22a because deletion is effected from a specified position until the next position name c appears. It is seen that the subheader 10 has also been deleted. It should be noted that the processing can be effected in either situation merely by specifying a name without moving the cursor to any specific position. This improves the operability significantly.

If it is desired to move a name by the Move process in the case of a region specification, it can be done by selecting a parameter when the data for the entire region are specified. Moreover, since the automatic execution function can be effected by specifying a name (digital-type specification method) rather than by moving a cursor (analog-type specification method), reliability in operation can be improved.

Figure 23:
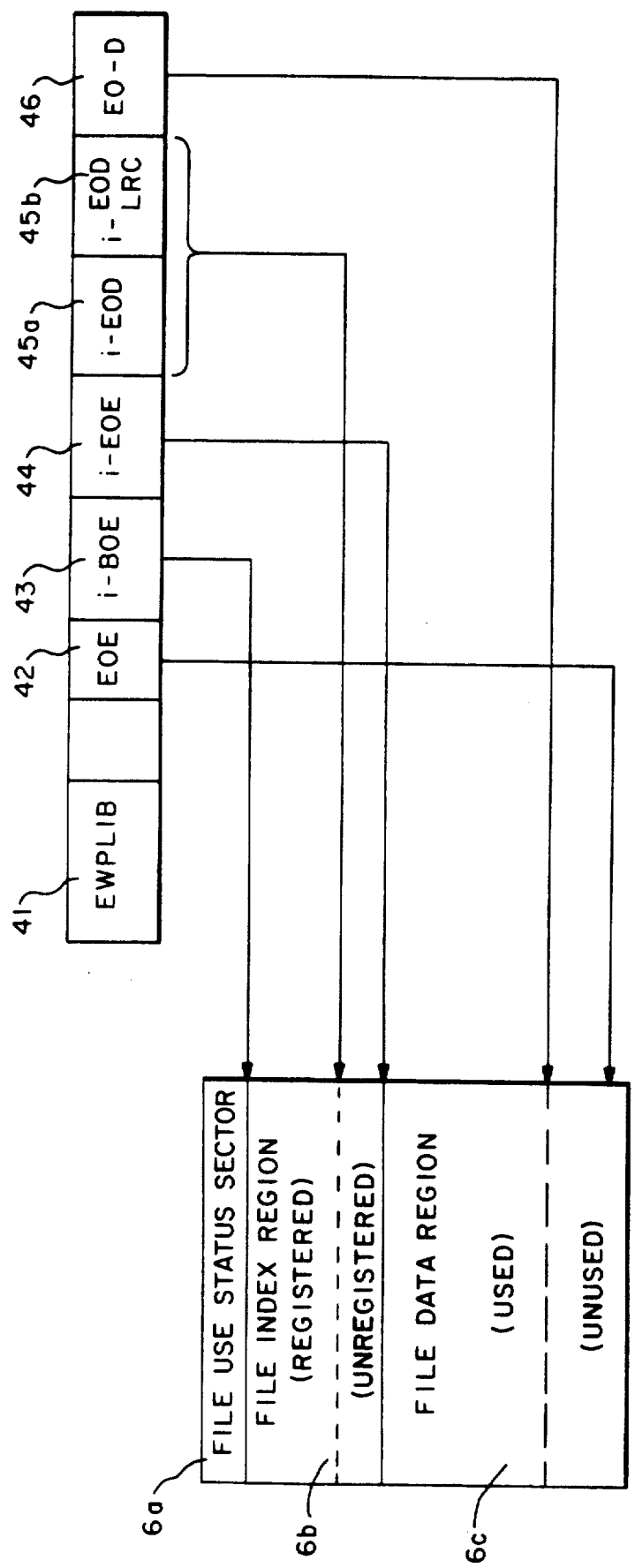
Figure 24:
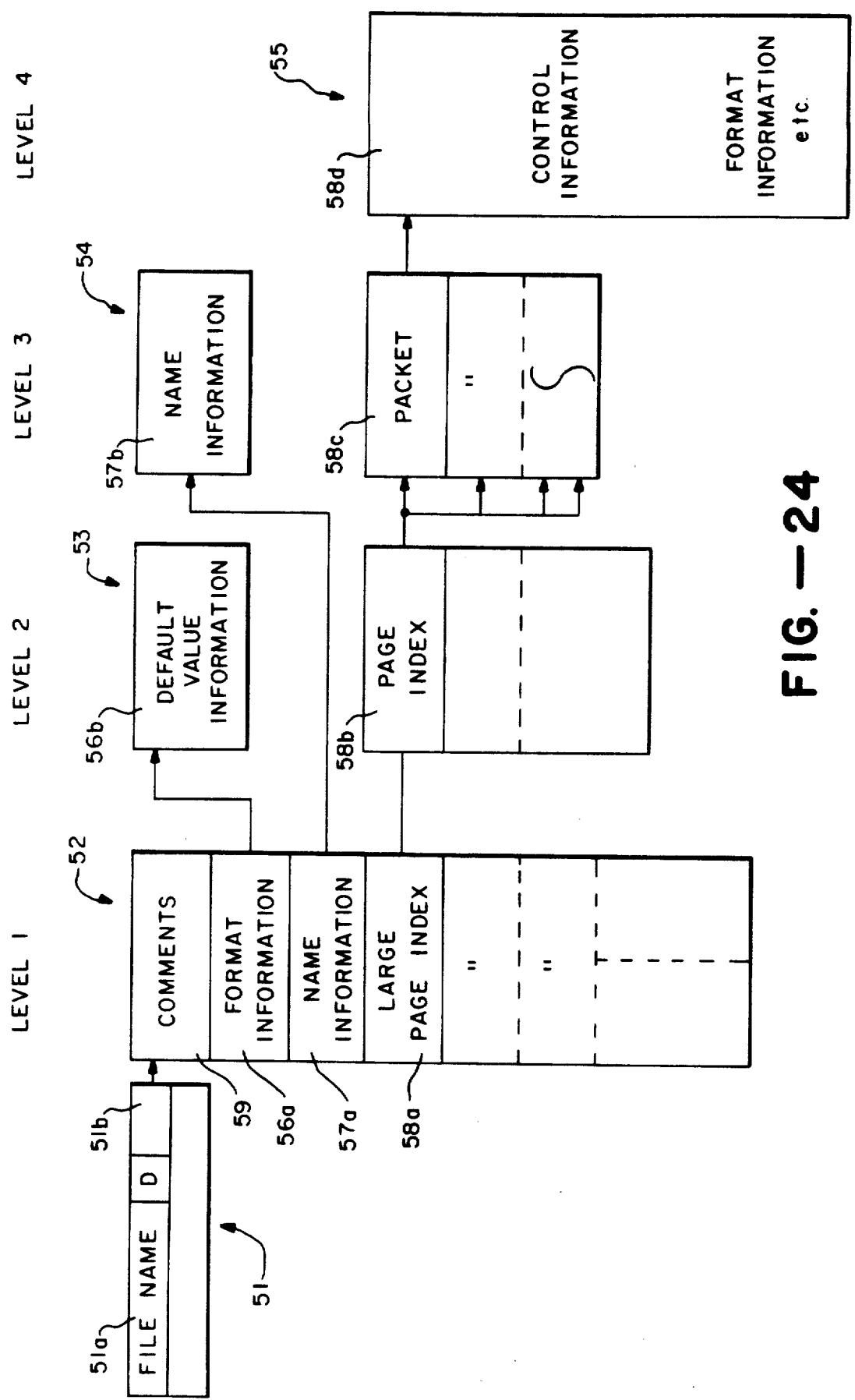

Reference is now made to FIGS. 23 and 24 to explain an example of the structure of a file used for a processor of the present invention. As shown in FIG. 23, a continuous region is divided into three parts which may be identified as a status sector 6a, an index region 6b and a file data region 6c, the status pointers of the regions 6b and 6c being stored in the status sector 6a. The status sector 6a may include as shown in FIG. 23 data such as the name of the medium (41), the end of the memory area that can be used by the system (42), the starting position of the file index region 6b (43), the end position of the file index region 6b (44), the sector and column numbers at the end position of the registered area of the file index region (45a and b) and the end position of the used area of the file data region 6c (46).

The file name 51a shown in FIG. 24 is one of the file indexes which make up the index region 6b and the file index 51 also contains individual position information 51b to the file data region 6c. The file data region 6c generally includes more than three or four levels.

The first level 52 includes comments 59 regarding this sentence file, the format information 56a including the position information to the sector having the format information (default value) 56b of that sentence file, the name information 57a including the position information to the sector having the information for which name specification (region specification or position specification) was made within this sentence file, the position information 58a to be assigned when the sentence file is partitioned in units of multiple pages, the position information 58b for a situation when data in units of pages are further partitioned in units of single pages, and the packet 58c further divided into units of single pages and containing the actual character information, format information which has been modified in the middle, control information, etc. 58d.

As shown in FIG. 25, the name information 56a of the first level 52 contains data such as a name image 61, a name number 62, a flag 63 which indicates whether it is region specification, position specification or OFF, the starting and end points 64a and 64b of the region, and LINK 65 which shows the position information regarding the succeeding name information. The format of the name information 57b of the third level 54 is shown in FIG. 26 wherein "Number of Bytes" 71 means the number of bytes in the character string information, "Control" 72 indicates whether the subsequent datum is a character string or format information, and "Character String" 73 contains character string data and control information. Name information as shown in FIG. 27 may be included as a kind of character string. In FIG. 27, SUB represents a sub-sequence code, No. 1 indicates the presence of name information and No. 2 coincides with the name number of the name information.

FIG. 28 illustrates how the data in the vicinity of "(9) Function" of FIG. 19a are actually stored. Reference being made to FIG. 28, "1B", "20" and "02" after "Function*" represent respectively the sub-sequence of FIG. 27, the starting position for specifying name region and the registration number indicating the position within the name information data of FIG. 24. Similarly, "1B", "21" and "02" after the blank ("SP") respectively represent the sub-sequence, the end position for specifying name region and the same registration number of the name information data.

Figure 29:
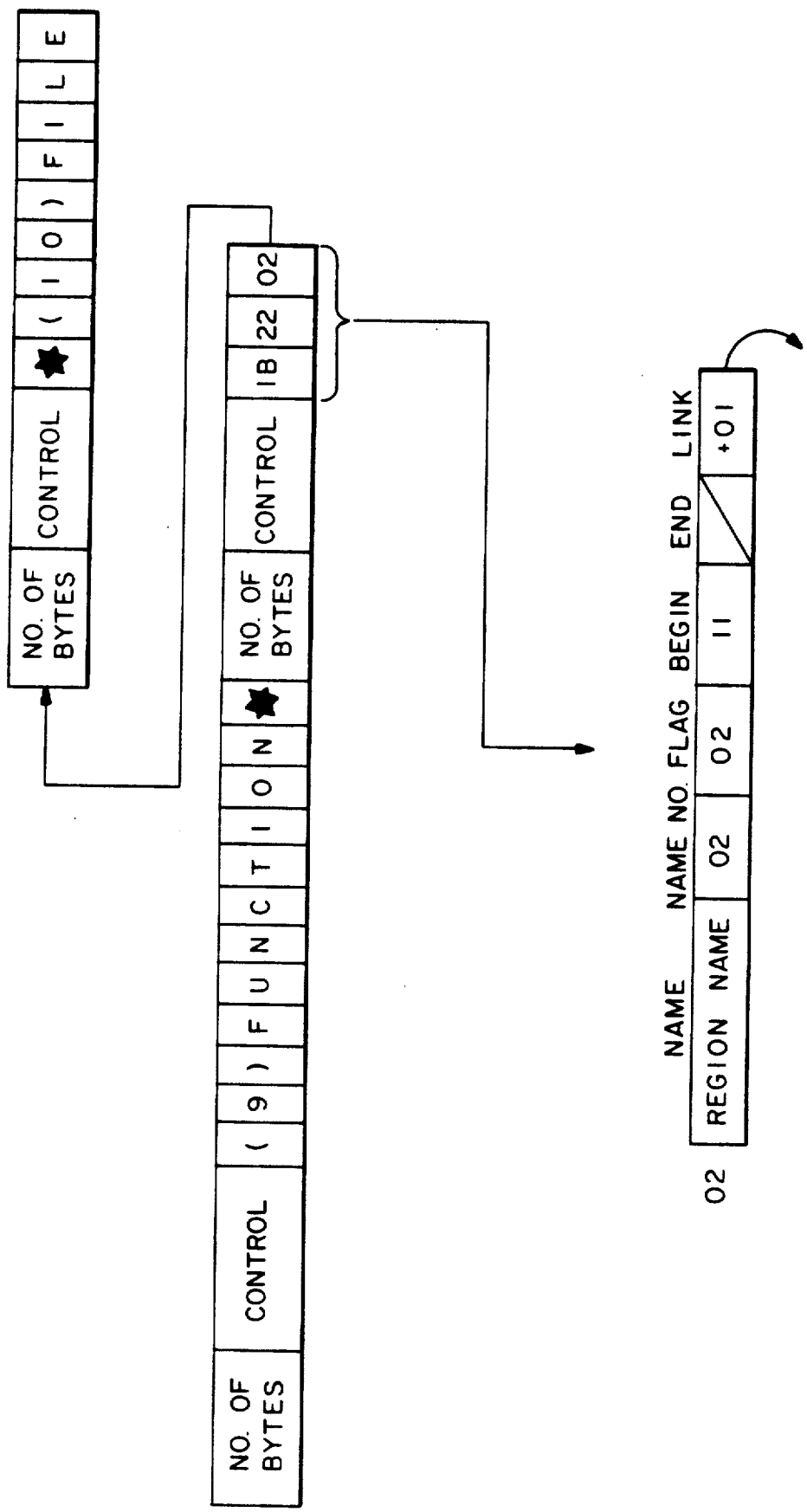

FIG. 29 illustrates how the data in the vicinity of "(9)- Function" of FIG. 20a are actually stored. This is an example of position specification so that "1B", "22" and "02" after "Function*" represent respectively the sub-sequence, the position information of position specification and the registration number of the name information.

In summary, the present invention allows the name of a position or a region to be used for specifying a particular position in a sentence or a particular character string or sentence so that various processes can be carried out. Operability of a word processor can be improved and documents can be created more efficiently than by the conventional method of specification by the page.

What is claimed is:

1. A word processor, comprising:
    an input means for receiving commands;
    an output means for outputting an image which output means is in the form of a CRT display device which CRT display device includes a screen having divisible regions;
    a control means in connection with the input means and the output means;
    a first command function means for sending a signal to the control means whereby the first command function means directs the control means to divide a region of the output means corresponding to one page into a plurality of block, specifying a sentence or sentences to be placed in each of the blocks; and
    a second command function means for sending a signal to the control means whereby the control means is directed to specify a priority sequence among the blocks or among sentences specified through the input means.

* * * * *